United States Patent [19]

McCain

[11] 4,100,113

[45] Jul. 11, 1978

[54] ELECTROLYTIC CELL MEMBRANE AND METHOD OF PREPARATION BY PLASMA POLYMERIZATION OF POLYAMIDE OR POLYTETRAFLUOROETHYLENE THIN FILMS ONTO POLYMERIC SUBSTRATES

[75] Inventor: G. Howard McCain, Painesville, Ohio

[73] Assignee: Diamond Shamrock Corporation, Cleveland, Ohio

[21] Appl. No.: 672,781

[22] Filed: Apr. 1, 1976

[51] Int. Cl.$^2$ .................. C25B 13/00; C08F 2/46; C08F 259/08
[52] U.S. Cl. ...................... 521/38; 204/165; 428/333; 428/422; 428/474
[58] Field of Search ............ 260/2.2 R, 857 UN, 900, 260/884, 886, 79.3 R; 526/901, 913, 255, 247, 201, 17, 49; 204/296, 195 P, 180 P, 165; 428/333, 422, 474

[56] References Cited

U.S. PATENT DOCUMENTS

| | | | |
|---|---|---|---|
| 2,731,411 | 1/1951 | Clarke | 204/180 |
| 3,068,510 | 12/1962 | Coleman | 18/2 |
| 3,257,334 | 6/1966 | Chen et al. | 260/884 |
| 3,522,226 | 7/1970 | Wright | 526/913 |
| 3,775,308 | 11/1973 | Yasudo | 204/296 |
| 3,829,324 | 8/1974 | Blair et al. | 204/165 |
| 3,839,172 | 10/1974 | Chapiro et al. | 260/884 |
| 3,933,607 | 1/1976 | Needles et al. | 260/884 |

FOREIGN PATENT DOCUMENTS 1,184,321   3/1970   United Kingdom.

OTHER PUBLICATIONS

Starcell–Spencer–Journal of Applied Polymer Science–vol. 16, pp. 1505–1514/1972.
Yosuda–Office of Saline Water – Re D. Jun. 1972, Progress Report No. 811.
Science Vol. 179 –P500e501 –Hollahon et al. Feb. 73.
Journal of Applied Polymer Science, vol. 21, 923–935, (1977).

*Primary Examiner*—Joseph L. Schofer
*Assistant Examiner*—Peter F. Kulkosky
*Attorney, Agent, or Firm*—Bruce M. Winchell

[57] ABSTRACT

Disclosed is an improved hydraulically impermeable cation exchange membrane for an electrolytic cell and a method for the preparation of such a membrane using a copolymeric substrate and applying to the surface thereof by means of plasma polymerization, a very thin top coating of a second polymeric material to drastically reduce the permeability of the substrate material with a minimal effect upon the bulk properties of the resultant membrane. Such top coatings may be applied over the basic substrate or over surface treated substrates to enhance the chemical resistivity of the membrane to chemical breakdown occasioned by the electrolyte within the electrolytic cell.

5 Claims, No Drawings

ELECTROLYTIC CELL MEMBRANE AND METHOD OF PREPARATION BY PLASMA POLYMERIZATION OF POLYAMIDE OR POLYTETRAFLUOROETHYLENE THIN FILMS ONTO POLYMERIC SUBSTRATES

BACKGROUND OF THE INVENTION

The present invention relates generally to the use of plasma polymerization to apply a very thin top coating of of a chemically resistant polymeric material over the surface of a polymeric substrate to protect the substrate from chemical attack by the electrolyte and also to preserve surface treatments performed on the substrate prior to deposit of the top coating. More particularly, the present disclosure relates to an improved membrane for an electrolytic cell and a method of preparation thereof utilizing plasma polymerization techniques to deposit a continuous top coating of approximately 100 to 2000 Angstroms on a substrate material generally a copolymeric cation exchange material having pendent sulfonic acid groups with polymers of tetrafluoroethylene or of an amide. The resultant coated membrane surfaces produced current efficiencies exceeding those of the untreated membranes or surface treated membranes prior to coating thereof due to the drastic reduction of the permeability of the membrane material with a minimal effect upon the bulk properties and the cell potential, while maintaining good lifetimes under corrosive conditions.

Electrochemical methods of manufacture are becoming ever increasingly important to the chemical industry due to their greater ecological acceptability, potential for energy conservation, and the resultant cost reductions possible. Therefore a great deal of research and development has been applied to the electrochemical processes and the hardware for these processes. One major element for the hardware aspect of the electrolytic system is the cation exchange membrane which separates the anode compartment from the cathode compartment within the electrolytic cell to provide a divided electrolytic cell for more efficient electrochemical production.

Presently the membrane having the greatest utility is one capable of usage in a chlorine and caustic (sodium hydroxide) cell since chlorine and caustic in this country are produced almost entirely electrolytically from aqueous solutions of sodium chloride. Chlorine and caustic are essential and large volume commodities which are basic chemicals required by all industrial societies and presently a large portion of their manufacture comes from the diaphragm-type electrolytic cells. In the diaphragm cell process, brine (sodium chloride solution) is fed continuously into the anode compartment and flows through the diaphragm usually made of asbestos, backed by a cathode. To minimize back migration of the hydroxide ions, the flow rate is always maintained in excess of the conversion rate so that the resulting catholyte solution has sodium chloride present. Hydrogen ions are discharged from the solution at the cathode in the form of hydrogen gas. The catholyte solution, containing caustic, unreacted sodium chloride and other impurities, generally has been concentrated and purified to obtain a marketable alkali metal hydroxide commodity and an alkali metal chloride which can be reused in a chlorine and caustic electrolytic cell for further production of alkali metal hydroxide. This is a serious drawback since the costs of this concentration purification process are rising rapidly.

With the advent of technological advances such as the dimensionally stable anode which permits ever narrowing gaps between the electrodes and the hydraulically impermeable cation exchange membrane, it has become readily apparent that the electrolytic cell will be more economical in the future. If the membrane can produce at high current efficiencies and withstand the anolyte solution which normally contains highly corrosive concentrations of free halide for extended periods of time, a significant purity and concentration increase in the end product may be possible with a given electrolytic cell thus saving secondary steps in such a process.

To date the membrane which seems to have the longest life time is a thin film of fluorinated copolymer having pendent sulfonic acid groups. Membranes of this general type are available from E. I. duPont deNemours & Co. under the trademark NAFION. It has been found that certain types of surface treatments of the NAFION-type membrane substrate will yield higher current efficiencies but generally with a corresponding higher cell potential and a reduction in the useful lifetime of the membrane in the corrosive surroundings of a chlorine and caustic electrolytic cell. It would therefore be very advantageous to provide an improved membrane which will have a substantially longer useful lifetime in addition to having the improved current efficiency characteristics of membranes currently for use in various types of electrolytic cells for electrochemical production.

SUMMARY OF THE INVENTION

It is therefore an object of the present invention to provide an improved membrane and a method for the preparation thereof which will have the improved current efficiency characteristics and a commercially feasible lifetime in the corrosive surroundings of a chlorine and caustic electrolytic cell.

It is another object of the present invention, to provide an improved membrane and method for preparation thereof that will improve the current efficiency without chemical reaction with the substrate with very little power penalty.

It is a further object of the present invention to provide a surface on a membrane which will drastically reduce the permeability of the substrate with a minimal effect upon the bulk properties utilizing almost any organic molecule having a appreciable vapor pressure at 1 millimeter of mercury pressure as a monomer.

These and other objects of the present invention, together with the advantages thereof over existing and prior art forms which will become apparent to those skilled in the art from the detailed disclosure of the present invention as set forth hereinbelow, are accomplished by the improvements herein described and claimed.

It has been found that an improved hydraulically impermeable cation exchange membrane can be made up of a substrate having a copolymeric backbone and ion exchange pendent groups in sufficient number to produce $—SO_3H$ an equivalent weight in the range of 1000 to 1400 and on at least one side of the substrate, a thin coating in the range of 100 to 2000 Angstroms of a second polymeric material to provide a pin hole free coating that is integrally bonded to the substrate surface.

It has also been found that a method for preparation of an improved hydraulically impermeable cation exchange membrane can be accomplished by selecting a substrate from a group of:

(I)  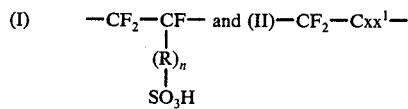

wherein R represents the group $$-CF-CF_2-O-(CFY-CF_2-O)_m$$
$$\phantom{-C}|$$
$$\phantom{-CF-CF_2-O-}R^1$$

in which $R^1$ is fluorine, or perfluoralkyl of 1 to 10 carbon atoms; Y is fluorine or trifluoromethyl; $m$ is 1, 2 or 3; $n$ is 0 or 1; $x$ is fluorine, chlorine or trifluoromethyl; and $x^1$ is $x$ or $CF_3(-CF_2-)_aO-$ wherein $a$ is 0 or an integer from 1 to 5; the units of formula (I) being present in an amount to provide a copolymer having an $-SO_3H$ equivalent weight of about 1000 to 1400;

copolymers of tetrafluoroethylene and hexafluoropropylene having grafted thereon a 50-50 mixture of styrene and alpha methylstyrene; or an insoluble, infusible copolymeric matrix formed from at least 20 percent by weight of a polyvinyl aromatic compound and not more than 80 percent of a monovinyl aromatic compound with a reinforcing material therein or no more than 70 weight percent by weight of a monovinyl aromatic compound without a reinforcing material therein, sulfonate groups chemically bonded to the aromatic nuclei of the matrix and a solvating liquid in cell relationship with the matrix, the sulfonate groups being present in an amount of no more than four equivalents of sulfonate groups for each mole of polyvinyl aromatic compound and not less than one equivalent of sulfonate groups for each 10 moles of poly- and monovinyl aromatic compound; the sulfonating liquid being at least 25 percent by volume of the resin; and applying a top coating selected from the group of polyamide or polytetrafluoroethylene to the surface of at least one side of the substrate by means of plasma polymerization to produce a thin pin hole free coating in the range of 100 to 2000 Angstroms integrally bonded to the substrate.

DESCRIPTION OF THE PREFERRED EMBODIMENT

The improved hydraulically impermeable cation exchange membrane which will overcome many of the disadvantages of the prior art forms and accomplish the objects of the invention as stated hereinabove has a substrate film material. The substrate material may be any of a number of commercially available hydraulically impermeable cation exchange membranes which are chemically resistant to the electrolytes to be used in the electrolyte cell for the particular process for which the membrane is desired, as long as it has a low resistance value so as to accomplish a high current efficiency for the given cell, and a sufficient lifetime so as to make its use in the given electrolytic cell economical for commercial electrochemical production.

One type of substrate material which may be used in the present invention as a thin film of fluorinated copolymer having pendent sulfonic acid groups. The fluorinated copolymer is derived from monomers of the formula

in which the pendent $-SO_2F$ groups are converted to $-SO_3H$ groups, and monomers of the formula

wherein R represents the group

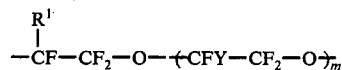

in which the $R^1$ is fluorine or fluoroalkyl of 1 thru 10 carbon atoms; Y is fluorine or trifluoromethyl; $m$ is 1, 2 or 3; $n$ is 0 or 1; $x$ is fluorine, chlorine or trifluoromethyl; and $x^1$ is $x$ or $CF_3(-CF_2-)_aO-$, wherein $a$ is 0 or an integer from 1 to 5.

This results in copolymers having the repeating structural units

and

In the copolymer there should be sufficient repeating units according to formula (3) above, to provide an $-SO_3H$ equivalent weight of about 1000 to 1400. Materials having a water absorption of about 25 percent or greater are preferred since higher cell voltages at any given current density are required for materials having less water absorption. Similarly, materials having a film thickness (unlaminated) of about 8 mils or more, require higher cell voltages resulting in a lower power efficiency.

Typically, because of large surface areas of the membrane in commercial cells, the substrate film material will be laminated to and impregnated into a hydraulically permeable, electrically non-conductive, inert, reinforcing member, such as a woven or non-woven fabric made of fibers of asbestos, glass, TEFLON, or the like. In film/fabric composite materials, it is preferred that the laminating produce an unbroken surface of the film resin on at least one side of the fabric to prevent leakage through the substrate film material.

The materials of this type are further described in the following patents which are hereby incorporated by reference: U.S. Pat. Nos. 3,041,317; 3,282,875; 3,624,053; British Pat. No. 1,184,321 and Dutch Published Application No. 72/12249 corresponding to U.S. Pat. No. 3,784,399. Substrate materials as aforedescribed are available from E. I. duPont deNemours and Co. under the trademark NAFION XR.

A second type of substrate material has a backbone chain of copolymers of tetrafluoroethylene and hexafluoropropylene and grafted onto this backbone a 50-50 mixture of styrene and alpha methyl styrene. Subsequently, these grafts may be sulfonated or carbonated to achieve the ion exchange characteristic. This type of substrate while having different pendent groups has a fluorinated backbone chain so that the chemical resistivities are reasonably high.

Another type of substrate film material which would have application in cells with less caustic conditions than that of a chlorine and caustic cell like those for electrochemical production of organic compounds, would be polymeric substances having pendent sulfonic acid groups wherein the polymeric backbone is derived from the polymerization of a polyvinyl aromatic component with a monovinyl aromatic component in an inorganic solvent under conditions which prevent solvent evaporation and result in a generally copolymeric substance although a 100 percent polyvinyl aromatic compound may be prepared which is satisfactory.

The polyvinyl aromatic component may be chosen from the group including: divinyl benzenes, divinyl toluenes, divinyl napthalenes, divinyl diphenyls, divinyl-phenyl vinyl ethers, the substituted alkyl derivatives thereof such as dimethyl divinyl benzenes and similar polymerizable aromatic compounds which are polyfunctional with respect to vinyl groups.

The monovinyl aromatic component which will generally be the impurities present in commercial grades of polyvinyl aromatic compounds include: styrene, isomeric vinyl toluenes, vinyl napthalenes, vinyl ethyl benzenes, vinyl chlorobenzenes, vinyl sylenes, and alpha substituted alkyl derivatives thereof, such as alpha methyl vinyl benzene. In cases where high-purity polyvinyl aromatic compounds are used, it may be desirable to add monovinyl aromatic compounds so that the polyvinyl aromatic compound will constitute 30 to 80 mole percent of polymerizable material.

Suitable solvents in which the polymerizable material may be dissolved prior to polymerization should be inert to the polymerization (in that they do not react chemically with the monomers or polymer), should also possess a boiling point greater than 60° C, and should be miscible with the sulfonation medium.

Polymerization is effected by any of the well known expedients for instance, heat, pressure, and catalytic accelerators, and is continued until an insoluble, infusible gel is formed substantially throughout the volume of solution. The resulting gel structures are then sulfonated in a solvated condition and to such an extent that there are not more than four equivalents of sulfonic acid groups formed for each mole of polyvinyl aromatic compound in the polymer and not less than one equivalent of sulfonic acid groups formed for each 10 mole of poly- and monovinyl aromatic compound in the polymer. As with the NAFION type material these materials may require reinforcing of similar materials.

Substrate film materials of this type are further described in the following patents which are hereby incorporated by reference: U.S. Pat. Nos. 2,731,411 and 3,887,499. These materials are available from Ionics, Inc. under the trademark IONICS CR6.

Materials as above described have been used as membranes in electrolytic cells for electrochemical production. The NAFION type being the most chemically resistant is the type that is generally used for the chlorine and caustic type electrolytic cells whereas the IONICS type which is less chemically resistant is generally used for organic chemical production or in situations where the electrolyte solutions are not as caustic or corrosive as that of the chlorine and caustic cells. Various means of improving these substrate materials have been sought, one of the most effective of which is the surface chemical treatment of the substrate itself. Generally these treatments consist of reacting the sulfonyl fluoride pendent groups with substances which will yield less polar bonding and thereby absorb fewer water molecules by hydrogen bonding. This has a tendency to narrow the pore openings through which the cations travel so that less water of hydration is transmitted with the cations through the membrane. An example of this would be to react the ethylene diamine with the pendent groups in the sulfonyl fluoride form to tie two of the pendent groups together by two nitrogen atoms in the ethylene diamine. Generally, in a film thickness of 7 mils, the surface treatment will be done to a depth of approximately 2 mils on one side of the film by controlling the time of reaction. This will result in good electrical conductivity and cation transmission with less hydroxide ion and associated water reverse migration.

It has been found that a substrate material can be improved to an even greater extent by use of plasma polymerization techniques to deposit a continuous thin film upon the surface of the substrate material of almost any electrically conducting organic structure to improve the current efficiency of a given membrane and while maintaining good lifetimes for a given membrane in the corrosive surroundings of the electrolytic cell. This type of coating may be applied over the surface of the raw substrate material as described above or over the surface treated substrate material. Plasma polymerization chemistry deals with the occurrence of chemical reactions in partially ionized gas composed of ions, electrons and neutral species. This state of matter can be produced through the action of either very high temperatures, strong electric current fields or magnetic fields. Since very high temperatures would degrade a polymeric substance and be of little value as far as producing a film of such a material, electric fields are used for the plasma polymerization processes. It is known for instance that polymerization can be initiated in a non-equilibrium or cold plasma utilizing almost any organic molecule having an appreciable vapor pressure at 1 millimeter of mercury pressure as a monomer. Unsaturation in this case is not a requirement. In an electric discharge, free electrons gain energy from an imposed electric current field and lose energy through collosions with neutral gas molecules. The transfer of this energy to the molecules leads to the formation of a variety of new species including atoms, free radicals and ions. In the instant case the free radicals and ions are of particular interest in that they can initiate a polymerization process. These products are all active chemically and thus serve as precursors to the formation of new stable compounds such as the polymeric film being deposited upon the surface of the substrate material.

Plasma polymerization techniques have the advantage that the coatings are deposited in a clean environment of a partial vacuum thus preventing dust particles from the surrounding environment from collecting on the substrate material surface either prior to deposition or thereafter. Such dust particles can cause membrane imperfections such that conventional casting methods yield membranes with imperfections which greatly minimize the effectiveness of such a film. The films prepared by plasma polymerization are generally found to be pinhole free and in thicknesses considerably less than that casting technology would presently permit.

There are presently available a variety of deposition systems which are suitable for preparing polymerized coatings to be laid down upon a substrate material. An example of a suitable apparatus would be one having a discharge vessel consisting of glass sealed off from the atmosphere such that a partial vacuum may be maintained therein allowing the vessel to be placed into an inductive coil. Also a means for measuring the pressure inside the vessel is necessary to control the partial vacuum and the partial pressures of monomeric materials introduced to the vessel. The discharge vessel has appropriate monomer inlets for allowing the monomeric materials into the discharge vessel for the plasma polymerization onto the surface of the substrate film material. Since all the parts can be made of glass and assembled by means of ground glass joints, the reaction vessels are interchangeable for cleaning and degassing steps. All glass parts are cleaned by immersing in chromic acid cleaning solution for several hours followed by rinsing, scrubbing with "alkonox" solution and a final copious deionized water rinse. The small amount of deposition occasionally left behind by this process is removed by baking in a glass annealing oven. Because standard taper joints and stopcocks can be used, the reaction vessels loaded with a sample can be degassed first on an auxiliary vacuum system, thereby increasing the number of samples prepared within a given time.

The discharge vessel, when mounted in the plasma apparatus is connected to a McLeod gauge to check the reference vacuum for a differential pressure transducer (less than $10^{-5}$ millimeters of mercury) and also to calibrate the pressure gauge. Also the discharge vessel is connected to a differential pressure transducer. Since the pressure of the monomer vapor cannot be measured by McLeod gauge due to condensation of the vapor during the compression process of the measurement, all pressure readings in either the closed or flow systems are taken with the transducer.

The apparatus can be evacuated to less than $10^{-5}$ millimeters of mercury by a mercury diffusion pump backed by a rotary pump, however, for most cases the diffusion pump will be found not to be necessary and can be bypassed. The reference vacuum for the pressure transducer is always connected to the diffusion pump and kept at a level of less than $10^{-5}$ millimeters of mercury.

The plasma is produced by an electrodeless radiofrequency discharge used to initiate the plasma. The RF power supply is a radiofrequency transmitter. The output is fed into a linear amplifier having a 500 watt capacity which is in turn connected to the RF coil through a network of tunable capacitors. A coupler may be used to measure the RF power and the RF power supply operates at 13.56 megaHertz to deliver continuously variable output power from 0-200 watts. A tuning circuit, located between the generator coil and the coupler, is used to match the impedance of the discharge vessel and the impedance of the amplifier output allowing the tuning circuit to be adjusted so that the reflected power is maintained at the minimum.

The substrate material may be placed into the discharge vessel such that upon introduction of monomeric materials to the vessel and production of a glow discharge plasma within the vessel, a very thin coating of a polymeric material will be deposited on the substrate material. To obtain the coating on only one side of the substrate material it must be attached to a backup plate such as a glass plate or covered on one side with a removable covering material.

In a typical procedure the monomer will be placed in a reservoir which is attached to a flow-meter and to the apparatus by several ground glass joints. The purified material to be used as a monomer is usually degassed and kept in the reservoir always at a vacuum pressure.

After degassing of the system the apparatus is pumped down to less than $10^{-3}$ millimeters mercury then the gas and vapor of the monomer are introduced by controlling the opening of needle valves, while the downstream side of the vessel is kept in a vacuum state by continuous pumping. A steady state pressure must be maintained within the apparatus such that the monomer vapor pressure or the partial vapor pressure of the various monomer components can be controlled rather precisely.

After a steady pressure of the gas monomer mixture is accomplished, the discharge is allowed to operate for a given time at a fixed power. After the discharge is stopped the pressure of each component is checked by reading the total pressure in the discharge vessel in order to make sure that no change occurred during the run, and the residual gases were pumped out before the air was admitted to the vessel.

The breakdown energy to initiate plasma by the electrodeless RF discharge is dependent upon (1) the pressure, (2) the frequency of the AC current, and (3) the dimensions of the vessel. It can be observed that generally speaking the wattage of the generator will necessarily be increased above the planned wattage to initiate the glow discharge. As soon as the glow discharge is initiated the wattage can be reduced to the pre-determined wattage for the process. The power requirements will be dependent upon the sizes of the reaction vessels, therefore for any given setup these calculations must be made independently. Various aspects of plasma polymerization techniques are further described in the following book which is hereby incorporated by reference: Hollaham and Bell, *Techniques and Applications of Plasma Chemistry*, New York, John Wiley and Sons, 1974.

In the case of the present invention the copolymeric substrate material was laid flat within the reaction vessel and the discharge maintained so as to coat the material on one side with a thickness of about 100 to 200 Angstroms of the polymeric material on the surface of the substrate material. The resultant membrane materials have significant advantages in a chlorine and caustic cell by reason of their increased current efficiencies and good lifetimes within the corrosive surroundings of chlorine and caustic cells. This generally applies to the fluorinated copolymeric substrate material with either a fluorocarbon or carbonyl (amide) material coated onto the surface thereof. Substrate materials with the polyvinyl and monovinyl backbone chain can be used for electrochemical production of organic substances where the conditions of this electrolytic cell are less abrasive. Substrate materials having fluorinated copolymers of ethylene and propylene in the backbone chain and styrene/alpha methyl styrene pendent groups may have many applications in the electrochemical processes having medium levels of corrosive electrolytes present.

In order that those skilled in the art will more readily understand the present invention and certain preferred aspects by which it may be carried into effect the following specific examples are afforded.

EXAMPLE 1

A NAFION substrate material as described above was coated with a 100 to 200 Angstroms layer of polytetrafluoroethylene on one side by means of plasma polymerization of tetrafluoroethylene gas. The resultant membrane material was then tested for gel water capacity by placing the sample in boiling water for 10 hours and measuring the weight gain for the given material. The material of Example 1 produced a gel water of 19.2 percent. Electrical conductance studies at 2 kilo Hertz showed a specific resistance 2201 to 2450 ohm centimeters. The membrane material of Example 1 was placed in a 3 square inch laboratory chlorine and caustic test cell wherein: the coated side was placed toward the cathode; the resultant sodium hydroxide concentration was in the range of 400 to 500 grams per liter or 35 to 42 percent; the potential across the cell ran in the range of 4.00 to 5.56 volts at current densities in the range of 1 to 3 amperes per square inch (155 milliamperes per square centimeter); the cell was run at a temperature in the range of 80° to 85° C; and the current efficiency based on daily runs ran in the range of 70 percent to 81.5 percent. The membrane was run in the cell for approximately 200 days with no signs of failure, thus showing a good lifetime.

EXAMPLE 2

A NAFION substrate material was coated with a 100 to 200 Angstroms layer of polyamide by means of plasma polymerization of acetylene, nitrogen and water vapors. This material when tested for gel water according to Example 1 yielded a result of 21.3 percent. The sample of Example 2 yielded a specific resistance of 286 to 330 ohm centimeters. When this membrane material was placed in a laboratory electrolytic cell under conditions, according to Example 1, the resultant sodium hydroxide concentration was approximately 500 grams per liter or 39 percent, the potential in the range of 3.42 volts to 5.00 volts and a current efficiency in the range of 66.8 to 83.1 percent. The membrane was run in the cell for approximately 65 days with no signs of failure. It should be noted that the potential is lower for the polyamide coating because it is hydrophilic which makes it a better electrical conductor than the hydrophobic polytetrafluoroethylene coating.

EXAMPLE 3

A NAFION substrate material was coated with a 100 to 200 Angstroms layer of allylamine on one side by means of plasma polymerication of allylamine gas. The resultant membrane material when tested for gel water was found to exhibit 21.7 percent gel water content. The specific resistance was found to be in the range of 1520 to 2024 ohm centimeters. When this resultant membrane material was tested in an electrolytic cell according to Example 1 it was found that the potential across the cell ran in the range of approximately 3.62 to 4.4 volts and exhibited a current efficiency in the range of 51 percent to a high of 72 percent. The resultant sodium hydroxide concentration was approximately 450 grams per liter or 35 percent. This membrane was run in the laboratory test cell for a period of 18 days with no signs of failure.

EXAMPLE 4

A NAFION substrate material as described above was coated with a 100 to 200 Angstroms layer of hydrocarbon on one side by means of plasma polymerization of cyclohexane vapor. The resultant membrane material was tested for gel water according to Example 1 and exhibited a gel water of 21.3 percent. The specific resistance ran in the range of 264 to 352 ohm centimeters. This material was also tested in the laboratory test cell according to Example 1 exhibiting a potential in the range of 3.6 to 4.2 volts and current efficiencies in the range of 50 to 62 percent. This membrane was run in the electrolytic cell for a period of 46 days, with no sign of failure.

EXAMPLE 5

Example 5 is a standard NAFION membrane material as described above for comparison against the plasma polymerized coating type membrane surfaces. A gel water test according to Example 1 generally yields a 20 to 25 percent gel water. It exhibited a specific resistance of 220 to 308 ohm centimeters. Upon testing this membrane material in the laboratory test cell according to the Example 1 it exhibited a potential in the range of 3.7 to 4.0 volts and the current efficiency in the range of 53 to 62 percent. This membrane was run in the electrolytic cell for a period of 56 days with no signs of failure.

EXAMPLE 6

The substrate material was a copolymeric material of polytetrafluoroethylene and polyhexafluoropropylene having grafted thereon a 50-50 mixture of styrene and alpha methyl styrene. This material was then sulfonated to obtain the ion exchange characteristics. The resultant substrate material was coated with a 100 to 200 Angstrom layer of polytetrafluoroethylene on one side by means of plasma polymerization of tetrafluoroethylene gas. The resultant membrane material yielded a gel water of 71.7 percent when tested according to Example 1. It was found to exhibit a specific resistance of 341 ohm centimeters. When tested in a chlorine and caustic electrolytic cell, the membrane cracked near the gaskets but this was not attributed to the membrane material.

EXAMPLE 7

A substrate material according to Example 6 was coated with 100 to 200 Angstroms layer of polyamide on one side by means of plasma polymerization of a mixture of nitrogen, acetylene, and hydrogen vapors. The resultant membrane material yielded a gel water of 64.5 percent when tested according to Example 1. It exhibited a specific resistance of 670 ohm centimeters. When tested in a chlorine and caustic electrolytic cell, the resultant sodium hydroxide concentration ran in the range of 240 to 377 grams per liter or 19 to 30 percent, the potential across the cell ran about 3.0 volts, and the current efficiency in the range of 15 to 30 percent. This membrane was run in the cell for 15 days when the cathode punctured the membrane.

EXAMPLE 8

A substrate material according to Example 6 was coated with 100 to 200 Angstroms layer of hydrocarbon on one side by means of plasma polymerization of cyclohexane vapors. The resultant membrane material yielded a gel water of 72 percent when tested according to Example 1. It exhibited a specific resistance of 462 ohm centimeters. When tested in a chlorine and caustic electrolytic cell, the resultant sodium hydroxide concentration ran in the range of 362 to 473 grams per liter or 30 to 37 percent, the potential across the cell ran about 3.8 volts, and the current efficiency in the range of 29 to 45 percent. This membrane was run in the cell for 18 days when it cracked near the gasket material.

Although the membranes of Examples 6, 7 and 8 did not perform well in the corrosive surroundings of a chlorine and caustic cell, it is believed that these membranes might be useful in less corrosive surroundings such as organic electrochemical production, or in dialysis electrolytic cells.

Thus it can be seen that membrane materials with coatings of polytetrafluoroethylene and polyamide according to Examples 1 and 2 exhibited the best results with current efficiencies significantly superior to the unmodified base membrane of Example 5 at comparable voltages and current densities. Also it can be seen that the NAFION type modified membranes can withstand the chlorine and caustic surroundings of the electrolytic cell to exhibit good lifetimes well within the range of the commercial feasibility and nearly equal to that of the unmodified NAFION membrane.

Thus it should be apparent from the foregoing description of the preferred embodiments that the composition herein described accomplishes the objects of the invention and solves the problems attendant to such membrane materials for use in electrolytic cells for electrochemical production.

What is claimed is:

1. An improved hydraulically impermeable cation exchange membrane consisting essentially of: a substrate selected from the group of a film of copolymer having the repeating structural units of the formula

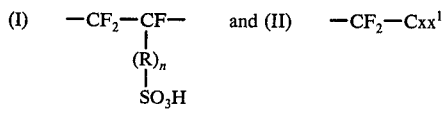

wherein R represents the group

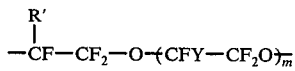

in which R' is fluorine, or perfluoroalkyl of 1 to 10 carbon atoms; Y is fluorine or trifluoromethyl; $m$ is 1, 2 or 3; $n$ is 0 or 1; $x$ is fluorine, chlorine or trifluoromethyl; and $x'$ is $x$ or $CF_3$—$(CF_2$—$)_aO$—; wherein $a$ is 0 or an integer from 1 to 5; the units of formula (I) being present in an amount to provide a copolymer having an —$SO_3H$ equivalent weight of about 1000 to 1400;

copolymers of tetrafluoroethylene and hexafluoropropylene having grafted thereon a 50-50 mixture of styrene and alpha methylstyrene which has been sulfonated; or an insoluble, infusible copolymeric matrix formed from at least 20 percent by weight of a polyvinyl aromatic compound and not more than 80 percent of a monovinyl aromatic compound with a reinforcing material therein and no more than 70 percent by weight of a monovinyl aromatic compound without a reinforcing material therein, sulfonate groups chemically bonded to the aromatic nuclei of the matrix and a solvating liquid in gel relationship with the matrix, the sulfonate groups being present in an amount no more than four equivalents or sulfonate groups for each mole of polyvinyl aromatic compound and not less than one equivalent of sulfonate groups for each 10 moles of poly- and monovinyl aromatic compound the solvating liquid being at least 25 percent by volume of the resin; and a top coating deposited upon the surface of at least one side of said substrate by plasma polymerization to produce a thin pinhole free coating in the range of 50 to 2000 Angstroms having a chemical makeup selected from the group of polyamide or polytetrafluoroethylene.

2. An improved hydraulically impermeable cation exchange membrane according to claim 1 wherein said second polymeric material has a thickness in the preferred range of 100 to 600 Angstrom units.

3. A method for the preparation of an improved hydraulically impermeable cation exchange membrane comprising the steps of: selecting a substrate material from a group of copolymers having the repeating structural units of the formula

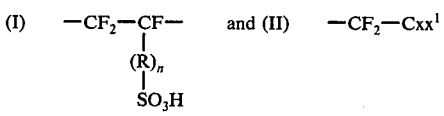

wherein R represents the group

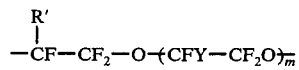

in which $R^1$ is fluorine, or perfluoroalkyl of 1 to 10 carbon atoms; Y is fluorine or trifluoromethyl; $m$ is 1, 2 or 3; $n$ is 0 or 1; $x$ is fluorine, chlorine or trifluoromethyl; and $x^1$ is $x$ or $CF_3$—$(CF_2$—$)_aO$—, wherein $a$ is 0 or an integer from 1 to 5; the units of formula (I) being present in an amount to provide a copolymer having an —$SO_3H$ equivalent weight of about 1000 to 1400;

copolymers of tetrafluoroethylene and hexafluoropropylene having grafted thereon a 50-50 mixture of styrene and alpha methylsytrene which has been sulfonated; or an insoluble, infusible copolymeric matrix formed from at least 20 percent by weight of a polyvinyl aromatic compound and not more than 80 percent of a monovinyl aromatic compound with a reinforcing material therein and no more than 70 weight percent by weight of a monovinyl aromatic compound without a reinforcing material therein, sulfonate groups chemically bonded to the aromatic nuclei of the matrix and a solvating liquid in gel relationship with the matrix, the sulfonate groups being present in an amount no more than four equivalents or sulfonate groups for each mole of polyvinyl aromatic compound and not less than one equivalent of sulfonate groups for each 10 moles of poly- and monovinyl aromatic compound the solvating liquid being at least 25 percent by volume of the resin; and applying a top coating selected from the group of polyamide or polytetrafluoroethylene to the surface of at least one side of said substrate by means of plasma polymerization to produce a thin pinhole free coating in the range of 100 to 2000 Angstroms.

4. An improved hydraulically impermeable cation exchange membrane according to claim 1 wherein at least one surface of said substrate material has been chemically treated by reacting the sulfonyl fluoride pendant groups with substances which will yield less polar bonding and therefor absorb fewer water molecules by hydrogen bonding prior to the deposition of said top coating thereon.

5. A method for the preparation of an improved hydraulically impermeable cation exchange membrane according to claim 3 comprising the additional step of treating at least one surface of the substrate material chemically by reacting the sulfonyl fluoride pendant groups with substances which will yield less polar bonding and thereby absorb fewer water molecules by hydrogen bonding prior to applying the top coating.

* * * * *